United States Patent [19]

Viscovich

[11] Patent Number: 4,914,953

[45] Date of Patent: Apr. 10, 1990

[54] TURBINE BLADE VIBRATION MONITOR FOR NON-MAGNETIC BLADES

[75] Inventor: Paul W. Viscovich, Longwood, Fla.

[73] Assignee: Westinghouse Electric Corp., Pittsburgh, Pa.

[21] Appl. No.: 268,140

[22] Filed: Nov. 7, 1988

[51] Int. Cl.⁴ .......................................... G01N 29/00
[52] U.S. Cl. ................................................ 73/660
[58] Field of Search ................. 73/660, 593, 579, 655, 73/659; 324/208, 461, 469

[56] References Cited

U.S. PATENT DOCUMENTS

| | | | |
|---|---|---|---|
| 3,307,164 | 2/1967 | Zimmer | 324/208 |
| 3,467,358 | 9/1969 | Zablotsky et al. | 73/660 |
| 3,908,444 | 9/1975 | Peter | 73/655 |
| 4,153,388 | 5/1979 | Naegeli et al. | 416/61 |
| 4,326,804 | 4/1982 | Mossey | 356/375 |
| 4,384,819 | 5/1983 | Baker | 415/14 |
| 4,413,519 | 11/1983 | Bannister et al. | 73/660 |
| 4,422,333 | 12/1983 | Leon | 73/660 |
| 4,507,658 | 3/1985 | Keating | 343/12 R |
| 4,573,358 | 3/1986 | Luongo | 73/660 |
| 4,593,566 | 6/1986 | Ellis | 73/660 |
| 4,644,270 | 2/1987 | Oates et al. | 324/207 |

OTHER PUBLICATIONS

Jones, "Development of a Noninterference Technique for Measuring Turbine Engine Rotor Blade Stresses," AIAA 21st Joint Propulsion Conference Jul. (1985).
EPRI Technical Brief RP 1957-3.

Primary Examiner—Hezron E. Williams
Assistant Examiner—Louis M. Arana
Attorney, Agent, or Firm—K. Bach

[57] ABSTRACT

A monitor for monitoring the vibration of the rotating portion of a turbine comprises radioactive nuclides carried by a rotating portion of the turbine. A sensor is positioned in a fixed location with respect to the rotating portion of the turbine. The sensor is responsive to the movement of the radioactive nuclides past the sensor for producing an input signal. A processor extracts vibration information from the input signal.

12 Claims, 2 Drawing Sheets 4,914,953

TURBINE BLADE VIBRATION MONITOR FOR NON-MAGNETIC BLADES

BACKGROUND OF THE INVENTION

1. Field of the Invention

The present invention is directed generally to monitoring operating parameters in a steam turbine generator and, more specifically, to the monitoring of turbine blade vibration.

2. Description of the Prior Art

Turbine blades, because of their complex design, can suffer from vibration at frequencies which correspond to natural frequencies of the blades called modes. Each mode is associated with a different type of vibration such as along the rotational axis of the turbine, perpendicular to the rotational axis of the turbine, etc. To prevent excessive vibration of the blade about its normal position, normal design practice dictates that the blades be constructed such that those modes are located between harmonics of the operating frequency of the steam turbine. However, manufacturing tolerances, changes in blade attachment to the rotor, changes in blade geometry due to erosion and changes in the operating frequency of the turbine, among other factors, cause mode frequencies to approach harmonics of the operating frequency. Additionally, damaging nonsynchronous vibration may also occur. Typically, nonsynchronous vibration in a steam turbine may occur as a result of buffeting wherein a low steam flow and a high back pressure cause the random excitation of the turbine blades or as a result of turbine rotor torsional stresses.

The approach of the modes to the harmonics of the operating frequency may result in physical damage to the steam turbine. When the amplitude of the vibration exceeds a certain level, objectionable stresses are set up in the blade. If the condition is not detected and remedied, the blade may eventually fracture resulting in an extremely costly forced outage of the machinery. Thus, a method for detecting that vibration is necessary to prevent such damage.

The prior art method for detecting turbine blade vibration is to attach strain gages to the turbine blades. The strain gages measure the vibration of the turbine blades to which they are attached and that information is communicated to analyzing equipment outside the machine by means of miniature transmitters affixed to the machine's rotating shaft at various locations.

That prior art method suffers from three significant drawbacks. First, the strain gage has a very short life due to erosion caused by steam passing through the turbine blades. Second, each blade requires a strain gage if all blades in a row are to be monitored. That represents a significant expense. Additionally, only a limited number of transmitters and, therefore, strain gages can be accommodated inside the machine. Third, the complexity of continuously and reliably supplying power to the strain gage and transmitting the signal reliably from the rotating rotor disk to stationary electronics creates severe difficulties.

To obviate those problems, apparatus exist for detecting turbine blade vibration which utilize permanently installed, non-contacting proximity sensors. One such apparatus is disclosed in U.S. Pat. No. 4,573,358 wherein a plurality of sensors spaced about the periphery of the blade row detects vibration of operator selected blades. Typically, the type of noncontacting sensor used is a magnetic sensor which induces eddy currents in the blade tip. Those eddy currents create a magnetic field which is sensed by the sensor. Thus, the apparatus is dependent upon the sensor's ability to induce eddy currents in the blade. Such an apparatus cannot function in a turbine which has blades made of non-magnetic materials, materials in which it is extremely difficult to induce eddy currents, or materials which lose their magnetic properties at the temperatures and pressures at which the turbine operates. The apparatus also requires a clear line of sight between the sensor and the blade tip, and fairly close proximity between the sensor and blade tip for the sensor to be effective.

Thus, there is a need for a long-lived monitor that can function on turbines having blades made of magnetic material as well as on turbines having blades made of non-magnetic material. The need also exists for a vibration monitor that can operate with a sensor that need not be in close proximity to the movement being sensed and does not require a clear line of sight.

SUMMARY OF THE INVENTION

A monitor for monitoring the vibration of the rotating portion of a turbine comprises radioactive nuclides carried by a rotating portion of the turbine. A sensor is positioned in a fixed location with respect to the rotating portion of the turbine. The sensor is responsive to the movement of the radioactive nuclides past the sensor for producing an input signal. A processor extracts vibration information from the input signal.

According to one embodiment of the invention the radioactive nuclides emit gamma radiation and are carried by the turbine blades. The radioactive nuclides may be carried at the tips of the turbine blades or on a surface of the blades.

The sensor may be positioned in a clear line of sight with the radioactive nuclides or may be positioned such that there is intervening material between the sensor and the radioactive nuclides i.e., no clear line of sight between the sensor and the radioactive nuclides.

The present invention also includes a method for monitoring the vibration of the rotating portion of a turbine, comprising the steps of: generating radioactive nuclides on selected surfaces of the rotating portion of the turbine; sensing the movement of the radioactive nuclides past a sensor which produces an input signal; and processing the input signal to extract vibration information.

The method of the present invention contemplates generating the radioactive nuclides using Surface Layer Activation techniques.

The method and apparatus of the present invention provide a means for monitoring vibration in turbines having magnetic blades, non-magnetic blades, blades in which it is difficult to generate the eddy currents needed for magnetic sensors, and blades made of materials which lose their magnetic qualities at the operating temperatures and pressures of modern turbines. The monitor of the present invention can also operate without requiring close proximity to, or direct line of sight with, the radioactive nuclides carried by the rotating portion of the turbine. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein.

DETAILED DESCRIPTION OF THE PREFERRED EMBODIMENT

Figure 1:
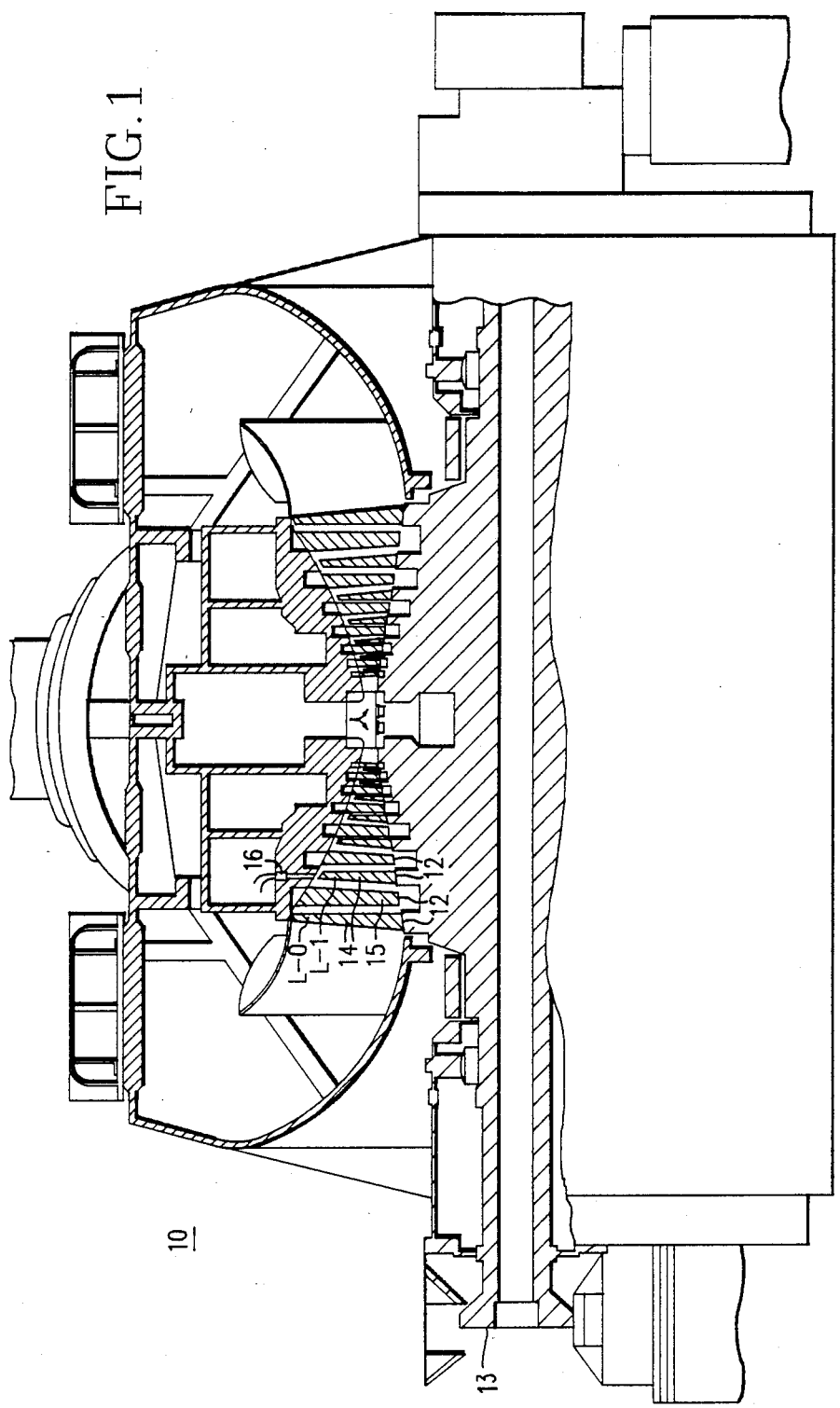
FIG. 1 illustrates a cross-sectional view of a steam turbine with which the method and apparatus of the present invention may be used.

A typical steam turbine 10 shown in FIG. 1 includes a plurality of turbine blade rows 12 consisting of rotating blades 14 carried by a rotor shaft 13 and stationary blades 15 of differing sizes corresponding to the high pressure, intermediate pressure, and low pressure stages of the steam turbine 10. The last row of rotating turbine blades and the next to the last row of rotating turbine blades are designated L-0 and L-1, respectively, and are unshrouded as is well known in the art. A sensor 16 is situated in the plane of the blade row L-1 directly above the unshrouded blades 14. The placement of the sensor 16 outside of the direct flow path of the steam through the turbine blades 14 prevents significant erosion of the sensor 16.

Figure 2:
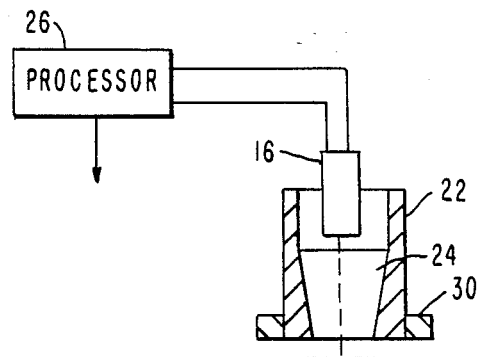
FIG. 2 illustrates a turbine blade carrying radioactive nuclides and a sensor responsive to the gamma radiation emitted by the nuclides.
Figure 2:
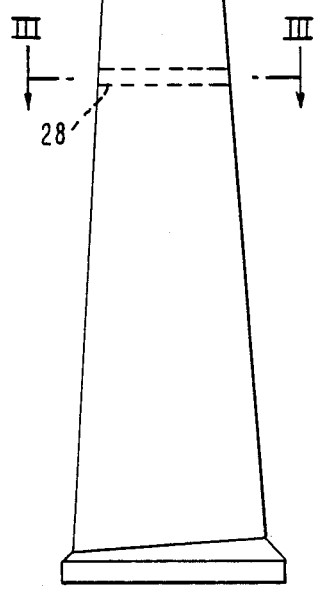

One of the turbine blades 14 together with the sensor 16 is shown in detail in FIG. 2. Also shown is FIG. 2 is a shield 30 which is used to minimize the amount of steam that escapes around the blade tips. The tip 18 of the blade 14 carries radioactive nuclides 20 which are produced as a result of Surface Layer Activation (SLA). SLA is achieved through the use of an accelerator ion beam to generate the radioactive nuclides 20. It is known that SLA has no effect on the mechanical properties of the material to which it is applied. The characteristic gamma rays that are emitted from the induced radioactive nuclides, while strong enough to be detected, do not present a health hazard for personnel.

The sensor 16 is positioned within a shield 22 and is mounted in a fixed location with respect to the rotating blades 14. The shield 22 has a portion 24 shaped to act as a collimator. The shield 22 may be constructed of lead or other dense material which will absorb the gamma radiation.

As the blade 14 carrying the radioactive nuclides 20 moves past the sensor 16, the gamma radiation sensed by the sensor 16 increases until a peak value is reached when the blade 14 is directly under the sensor 16. Thereafter, the gamma radiation falls to a minimum value as the blade moves away from the sensor. The radiation sensed by sensor 16 begins to increase again as the next blade having radioactive nuclides 20 begins to approach the sensor 16. The signal thus produced by the sensor 16 is responsive to the movement of the radioactive nuclides 20 past the sensor 16 such that the sensor 16 produces an input signal which is representative of blade passing events.

The input signal produced by the sensor 16 is input to a processor 26. The processor 26 may be any type of known processing circuitry capable of extracting vibration information from an input signal representative of blade passing events as disclosed, for example, in U.S. Pat. No. 4,573,358, which is hereby incorporated by reference.

The vibration monitor of the present invention may be used in conjunction with turbines having magnetic blades. It may also be used in conjunction with turbines having blades constructed of nonmagnetic materials such as titanium and ceramics, r materials in which it is difficult to produce the eddy currents necessary for magnetic sensors to be effective such as stainless steels.

Another feature of the present invention is that the disclosed vibration monitor is free from the operational constraints imposed by Curie temperature limits. The Curie temperature is a transition temperature that marks a change in the magnetic properties of a material, e.g. from a magnetic to a non-magnetic state. The Curie temperature for carbon steel is approximately 1400° F. (760° C.) while the operating temperatures for new combustion turbines is 2300°–2400° F. (1260°–1315° C.). With the present invention, it is possible to monitor blades in the hot section of such new turbines.

Figure 4:
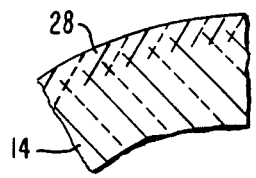
FIG. 4 is an enlargement of the area A shown in FIG. 3.
Figure 3:
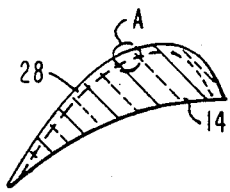
FIG. 3 is a cross-sectional view of the blade of FIG. 2 taken along the lines III—III.

It is also possible to use this invention to selectively activate a strip 28 on the blade chord or a transition section and monitor vibratory patterns through the use of non-intrusive sensors embedded in the stationary blades 15. A cross-sectional view of the blade 14 carrying the strip 28 is shown in FIG. 3. An area A of the blade 14 of FIG. 3 is shown enlarged in FIG. 4 to better illustrate the radioactive nuclides 28.

Figure 5:
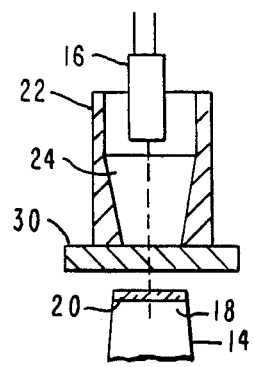
FIG. 5 illustrates a sensor configuration in which there is no clear line of sight between the sensor and the radioactive nuclides.

Unlike magnetic pick-up coils which require close proximity to the blade and a clear line of sight, gamma radiation can readily penetrate intervening materials, such as the turbine seal 30 surrounding the turbine blades, as shown in FIG. 5. That characteristic permits monitoring of the activated surfaces without disturbing the flow field.

Although the preferred embodiment of the present invention has been shown using only one sensor 16, more than one sensor may be required in certain applications. The number of sensors 16 provided for each blade row 12 is a function of the lowest frequency of blade vibration of interest in any particular application as is known.

The present invention also includes a method for monitoring the vibration of the rotating portion of a turbine, comprising the steps of: generating radioactive nuclides on selected surfaces of the rotating portion of the turbine; sensing the movement of the radioactive nuclides past a sensor which produces an input signal; and processing the input signal to extract vibration information.

While the present invention has been described in connection with an exemplary embodiment thereof, it will be understood that many modifications and variations will be readily apparent to those of ordinary skill in the art. This disclosure and the following claims are intended to cover all such modifications and variations.

What I claim is:

1. A vibration monitor for monitoring the vibration of the rotating portion of a turbine, comprising:
    certain of the atoms of a rotating portion of the turbine being activated to form radioactive nuclides;
    sensor means positioned in a fixed location with respect to the rotating portion of the turbine, said sensor means being responsive to the movement of said activated atoms of the rotating portion past said sensor means for producing an input signal; and processor means responsive to said input signal or extracting vibration information therefrom.

2. The vibration monitor of claim 1 wherein said radioactive nuclides emit low level gamma radiation.

3. The vibration monitor of claim 2 additionally comprising a collimator positioned to collimate the gamma radiation input to said sensor means.

4. The vibration monitor of claim 3 wherein said collimator is constructed of a shielding material.

5. A turbine having a vibration monitor for monitoring the vibration of the rotating portion of the turbine, comprising:
   a rotor;
   a plurality of blades carried by said rotor;
   certain of the atoms of certain of said blades being activated to form radioactive nuclides;
   sensor means positioned in a fixed location with respect to said certain blades, said sensor means being responsive to the movement of said activated atoms of said certain blades past said sensor means for producing an input signal representative of blade passing events; and processor means responsive to said input signal for extracting vibration information therefrom.

6. The turbine of claim 5 wherein said radioactive nuclides are carried on the tips of said certain blades.

7. The turbine of claim 5 wherein said radioactive nuclides are carried on a surface of said certain blades.

8. The turbine of claim 5 wherein said sensor means is positioned to provide a direct line of sight with said radioactive nuclides.

9. The turbine of claim 5 wherein said sensor means is positioned such that there is intervening material between said sensor means and said radioactive nuclides.

10. A method for monitoring the vibration of the rotating portion of a turbine, comprising:
    generating radioactive nuclides on selected surfaces of the rotating portion of the turbine;
    sensing the movement of said radioactive nuclides past a sensor to produce an input signal; and
    processing said input signal to extract vibration information therefrom.

11. The method of claim 10 wherein the step of generating radioactive nuclides includes using surface layer activation techniques to generate said nuclides.

12. The method of claim 11 wherein the step of sensing the movement includes sensing the gamma radiation emitted by the radioactive nuclides.

* * * * *